(12) United States Patent
Ruutu

(10) Patent No.: US 6,940,813 B2
(45) Date of Patent: Sep. 6, 2005

(54) SYSTEM AND METHOD FOR FACILITATING END-TO-END QUALITY OF SERVICE IN MESSAGE TRANSMISSIONS EMPLOYING MESSAGE QUEUES

(75) Inventor: Jussi Pekka Ruutu, Espoo (FI)

(73) Assignee: Nokia Corporation, Espoo (FI)

( * ) Notice: Subject to any disclaimer, the term of this patent is extended or adjusted under 35 U.S.C. 154(b) by 69 days.

(21) Appl. No.: 10/359,043

(22) Filed: Feb. 5, 2003

(65) Prior Publication Data

US 2004/0151114 A1 Aug. 5, 2004

(51) Int. Cl.⁷ .................................................. H04L 12/54
(52) U.S. Cl. ...................................... 370/231; 370/412
(58) Field of Search .............................. 370/230, 230.1, 370/231, 412, 413, 414, 415, 416, 417, 418, 395.2, 395.21; 709/230–235

(56) References Cited

U.S. PATENT DOCUMENTS

| | | | | |
|---|---|---|---|---|
| 5,519,689 A | * | 5/1996 | Kim | 370/232 |
| 5,574,720 A | * | 11/1996 | Lee | 370/229 |
| 5,696,701 A | | 12/1997 | Burgess et al. | |
| 5,828,653 A | * | 10/1998 | Goss | 370/230 |
| 6,046,981 A | * | 4/2000 | Ramamurthy et al. | 370/232 |
| 6,108,307 A | * | 8/2000 | McConnell et al. | 370/235 |
| 6,115,365 A | * | 9/2000 | Newberg et al. | 370/312 |
| 6,147,970 A | * | 11/2000 | Troxel | 370/235 |
| 6,182,146 B1 | | 1/2001 | Graham-Cumming, Jr. | |
| 6,212,361 B1 | * | 4/2001 | Lui | 455/512 |
| 6,349,341 B1 | | 2/2002 | Likes | |
| 6,466,984 B1 | * | 10/2002 | Naveh et al. | 709/228 |
| 6,477,167 B1 | * | 11/2002 | Wu | 370/395.21 |
| 6,608,816 B1 | * | 8/2003 | Nichols | 370/235 |
| 6,614,790 B1 | * | 9/2003 | Veres et al. | 370/395.2 |
| 6,633,575 B1 | * | 10/2003 | Koodli | 370/412 |
| 2002/0091802 A1 | * | 7/2002 | Paul et al. | 709/220 |
| 2003/0115317 A1 | * | 6/2003 | Hickson et al. | 709/224 |

FOREIGN PATENT DOCUMENTS

GB 2 338 372 A 12/1999

OTHER PUBLICATIONS

BEA MessageQ Datasheet, http://www.bea.com/products/messageq/datasheet.shtml (printed from internet on Jan. 8, 2003).

* cited by examiner

*Primary Examiner*—Min Jung

(57) ABSTRACT

A system and method for buffering messages between at least two applications over a network implementing a Quality of Service (QoS) framework. Messages are transmitted from a source application to an intermediary message queue for message buffering. A message queue QoS is imparted at the message queue to the flow of the messages traversing the message queue, and the end-to-end QoS can then be provided for the flow of messages over the network.

57 Claims, 9 Drawing Sheets

SYSTEM AND METHOD FOR FACILITATING END-TO-END QUALITY OF SERVICE IN MESSAGE TRANSMISSIONS EMPLOYING MESSAGE QUEUES

FIELD OF THE INVENTION

This invention relates in general to communications, and more particularly to a system and method for providing end-to-end quality of service for application message transfers utilizing message queues.

BACKGROUND OF THE INVENTION

While computers are still used for their traditional processing purposes, advances in communication infrastructures and protocols have turned standard computing devices into valuable communication tools. Computers communicate with each other, and with other electronic devices, over networks ranging from local area networks (LANs) to wide reaching global area networks (GANs) such as the Internet. Other electronic devices have experienced similar transformations, such as mobile phones, personal digital assistants (PDAs), and the like. Today, these wireless devices are being used for a variety of different types of communication. For example, while the analog mobile phone was traditionally used for analog voice communications, the mobile phone of the present and future is a powerful communication tool capable of communicating voice, data, images, video, and other multimedia content. PDAs, once the portable calendaring and organizational tool, now often include network communication capabilities such as e-mail, Internet access, etc. With the integration of wireless and landline network infrastructures, information of all sorts can be conveniently communicated between wireless and landline terminals.

In carrying out such communications between devices, the programs, applications, application instances, and the like (hereinafter "applications") operable on such devices often need to communicate with applications on other devices. For example, an application at the application layer may generate messages that are communicated to lower levels of the software architecture including, e.g., the transport layer, network layer, data link layer, and physical layer, where the encapsulated messages are transmitted over the network to other devices. Messages received at the receiving device move up the software architecture to ultimately provide the original message to an application on the receiving device.

To facilitate the communication of messages, message queues may be used. Generally, a message queue relates to the functionality that receives messages from an application and forwards them to a recipient application. The message queue serves as a temporary storage facility for traveling messages. Such message queues generally reside in the devices that are sending and receiving the messages, and alternatively may reside in an intermediary computing system on the network logically positioned between the sending and receiving devices.

The use of message queues removes many aspects of the message communication from the applications themselves. A message queue stores messages, such as when there is no connectivity between the communicating applications. Another benefit is the reliability, as the use of message queues provides safe and orderly delivery of messages. Thus, one benefit of utilizing message queues is that is obviates the need for application developers to develop, or even fully understand, the underlying functionality for performing these orderly transfers of messages to and from their applications.

Existing message queues buffer information in a first-in, first-out fashion. To date, the public Internet has been working on a "best effort" principle, meaning that there is no Quality of Service (QoS) available. The Internet Protocol (IP) network will thus make its best effort to deliver the data, but no guarantees are given. Existing message queues that operate in a first-in, first-out fashion also operate under a "best effort" paradigm, and therefore are appropriate for such a best effort network QoS.

However, different QoS methodologies are currently being developed for landline networks such as the Internet. For example, the Internet Engineering Task Force's (IETF's) standardization of the Differentiated Services (DiffServ) framework allows priority-based QoS mechanisms to be supported in IP routers. Another example is IETF's standardized Integrated Services (IntServ) framework. In addition to the IP protocol, cellular protocols are now starting to support QoS. Such frameworks will provide for varying QoS to content consumers.

It would be desirable that the use of such QoS methodologies provide "end-to-end" QoS between the applications and/or application instances associated with message transactions. Message queues, while otherwise providing benefits, may ultimately present a bottleneck to such end-to-end QoS. Because the QoS is limited by the weakest QoS link in the transfer, the "best effort" message queues render wireless and landline network QoS methodologies ineffectual. The present invention provides a solution to these and other problems of the prior art, and provides many advantages over prior art message transactions implementing message queues.

SUMMARY OF THE INVENTION

To overcome limitations in the prior art described above, and to overcome other limitations that will become apparent upon reading and understanding the present specification, the present invention discloses a system and method for providing end-to-end quality of service, notwithstanding the use of message queues along the transmission path.

In accordance with one embodiment of the invention, a method is provided for buffering messages between at least two applications over a network. One or more messages are transmitted from a source application to an intermediary Message Queue (MQ) for message buffering. An MQ Quality of Service (QoS) is imparted to the flow of the messages traversing the MQ. The flow of messages is then transmitted from the MQ subject to the MQ QoS.

In accordance with another embodiment of the invention, a method is provided for facilitating end-to-end Quality of Service (QoS) communication between at least two applications. One or more messages are transmitted from at least one first application and destined for at least one second application. The messages from the first application are received at a Message Queue (MQ). The MQ manipulates the output order of the messages to impart a QoS on further transmission of the messages. The messages, destined for the second application, are output from the MQ in the output order corresponding to the imparted QoS.

In accordance with more particular aspects of such a method, transmitting messages from the first application may include transmitting messages from multiple applications operable on a sending device such as a computer, mobile device, etc. In one embodiment, at least some of the messages from the multiple applications have different prioritization indicators relative to one another which impacts their relative transmission priorities. In another embodiment, at least some of the messages from the multiple applications do not directly contain the prioritization indicators inside the message itself, but rather the prioritization indicators are provided to the message queue through some other method, such as parameters in a function call, some control plane signaling method, or as a predefined table of the message queue. For example, the different prioritization indicators may include application identifiers associated with each of the plurality of applications, such that message prioritization is effected by application. As another example, the different prioritization indicators may include characteristics of the messages such as the message type, delay sensitivity, loss sensitivity, message priority, message discard probability, allocated bandwidth share, network QoS model, etc. In accordance with other more particular aspects of such a method, manipulating the output order of the messages at the MQ includes queuing the messages in a plurality of queues according to their relative transmission priorities, and scheduling the output of the messages from the queues according to a predetermined scheduling procedure. In another embodiment, the messages are first prioritized to identify which of the plurality of the queues in which each of the messages is to be entered.

In accordance with another embodiment of the invention, a method is provided for imparting a QoS to messages traversing an MQ logically coupled between source device having at least one source application and a destination device having at least one destination application. The method includes prioritizing the messages received from the source application into priority classes based on information associated with each of the messages. Each of the messages is queued into one of a plurality of MQ priority queues associated with the MQ, in response to prioritization of the messages. The method further includes scheduling an output order of the messages from the plurality of MQ priority queues based on a scheduling procedure. The messages are transmitted from the MQ to the destination application pursuant to the scheduled output order, thereby imparting the QoS to the messages traversing the MQ. In more particular aspects of such a method, prioritizing the messages into priority classes involves prioritizing the messages based on the application from which the messages originated, and/or prioritizing the messages into priority classes based on other message characteristics indicative of relative priorities between the messages.

In accordance with another embodiment of the invention, a system is provided for communicating information between a plurality of applications over a network. The system includes a number of first applications for transmitting messages over the network in accordance with a network QoS paradigm, and a number of second applications for receiving the messages via the network. An MQ module is coupled to receive the messages, and is configured to apply an MQ QoS to the messages transmitted from the first applications to the second applications.

In accordance with more particular aspects of such a system, the MQ module may include a prioritization module coupled to receive the messages and to prioritize the messages received from the first applications into priority classes based on prioritization indicators associated with each of the messages. Alternatively, prioritization may be effected outside the MQ, such as by the transmitting application(s) or other applications. In other more particular aspects of such a system, the MQ module may include a queuing module having a number of priority-based queues to temporarily store the messages, where each of the plurality of priority-based queues stores messages having like priorities. In still another aspect, the MQ module includes a scheduling module coupled to the queuing module to govern the order in which the messages from the plurality of priority-based queues are output to the network.

In accordance with another embodiment of the invention, a communication device operable on a network is provided. The communication device includes one or more application modules for receiving messages from one or more remote applications. The communication device also includes an MQ module, which in turn includes a prioritization module, priority-based queues, and a scheduling module. The prioritization module is coupled to receive and prioritize the messages received from the remote applications into priority classes based on prioritization indicators associated with each of the messages. The priority-based queues each temporarily store the messages having like priorities. The scheduling module is coupled to the plurality of queues to govern the order in which the messages from the plurality of priority-based queues are output. In more particular aspects of such a communication device, the communication device may be a mobile terminal operable on a wireless network, and/or may be a computing device operable on a landline and/or wireless network.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of a system and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration representative embodiments in which the invention may be practiced. It is to be understood that other embodiments may be utilized, as structural and operational changes may be made without departing from the scope of the present invention.

Generally, the present invention provides a manner of utilizing Message Queues (MQ) in the transfer of messages between applications, while providing end-to-end Quality of Service (QoS) between the applications. Messages are transmitted from one application to another, such as over a network, and one or more MQs buffer the messages during transit to facilitate the organized flow of messages. The MQ imparts a QoS to the message flow, and the messages can then be transmitted from the MQ subject to the QoS. In this manner, the MQ does not otherwise render useless any QoS implemented on the remaining communication path (e.g., on the network).

Figure 1:
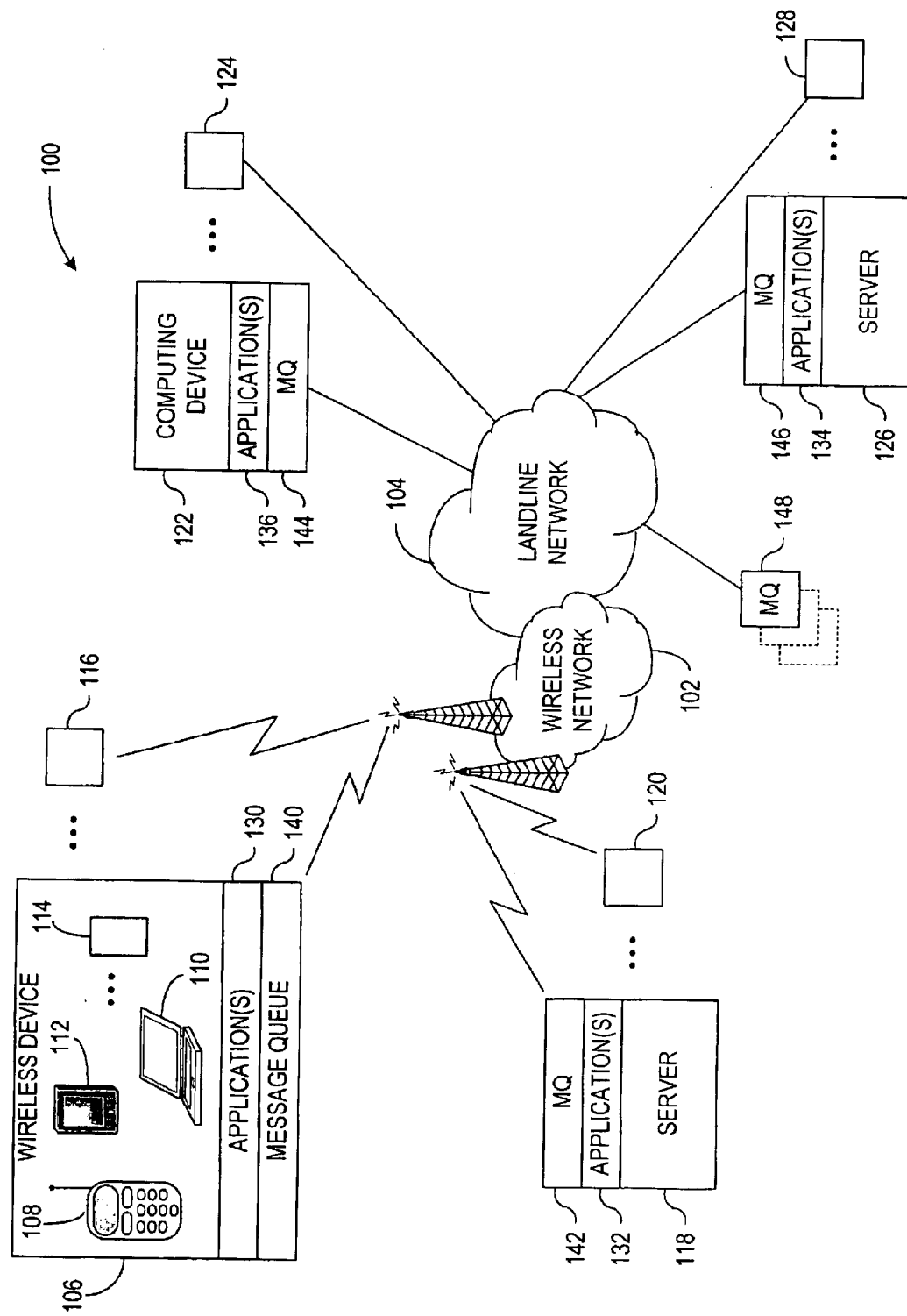
FIG. 1 is a block diagram illustrating an exemplary networking environment in which the principles of the present invention are applicable.

In one embodiment, the present invention involves software architecture in landline and/or mobile communication systems that includes functionality relating to the intercommunication of applications. As previously described, message queuing methodologies are used to facilitate communication between applications. FIG. 1 is a block diagram illustrating an exemplary networking environment 100 in which the principles of the present invention are applicable. The networking environment 100 may include, for example, one or more wireless networks 102 and/or landline networks 104. The wireless network(s) 102 may represent any one or more known or future wireless networking technologies, such as the Global System for Mobile Communications (GSM), Universal Mobile Telecommunications System (UMTS), Personal Communications Service (PCS), Time Division Multiple Access (TDMA), Code Division Multiple Access (CDMA), Wideband CDMA (WCDMA), or other mobile network transmission technology. Other wireless communications means may also couple the various terminals, such as short-range wireless technologies (e.g., Bluetooth). Any wireless device 106 or other communications terminal may be coupled to such wireless network(s) 102, such as mobile phones 108 and other mobile communicators, laptop or other portable computers 110, Personal Digital Assistants (PDA) 112, or any other similar terminal capable of communicating via the wireless network 102, as represented by generic wireless device 114. Any number of wireless devices may be coupled to the wireless network 102, as represented by wireless device-N 116. Other devices or network elements 118, 120 may also be coupled to the wireless network 102. One example of such a network element is a server 118.

Landline network(s) 104 may include a Global Area Network (GAN) such as the Internet, one or more Wide Area Networks (WAN), Local Area Networks (LAN), and the like. Any computing device or other terminal capable of communication may be operable via the landline network 104, such as computers 122, 124 (including desktop, workstations, laptop, conferencing systems, etc.) or any other similar computing device capable of communicating via the network 104. Other devices or network elements 126, 128 may also be coupled to the landline network 104. For example, server 126 may provide content, data, etc. to any one or more other computers 122, 124, wireless devices 106, 116, and/or other servers 118 or other network elements 120, 128. The present invention is applicable with any network element having programs or applications in which communication is desired with other programs/applications. Further, while the present invention is particularly beneficial in networking environments, the present invention is equally applicable to stand-alone systems where communications between applications or application instances occurs.

In the illustrated embodiment of FIG. 1, each of the illustrated network elements includes one or more applications that may communicate with other applications in other network elements. For example, the wireless device 106 includes application(s) 130, the servers 118 and 126 include application(s) 132 and 134 respectively, and the computing device 122 includes application(s) 136. Software used to facilitate communication between such applications is often referred to as application communication "middleware."

The present invention is directed to an aspect of such middleware, namely message queues, that facilitate communication between such applications 130, 132, 134, 136, and/or other applications. Application data traversing a network is often referred to as messages. Message queues provide a holding location in the network to temporarily store the messages during transit. The message queue (MQ) may reside in the computer, server, or other system that is sending the messages, and/or in the system that is receiving the messages. For example, any one or more of the network elements 106, 118, 122, 126 may include a MQ, such as MQs 140, 142, 144, 146 respectively. Alternatively, MQs may be logically positioned between the sending and receiving systems as an intermediary computing system, as represented by the one or more MQs 148. As is described in greater detail below, the present invention allows a desired end-to-end chain of Quality of Service to be obtained, notwithstanding the use of message queuing mechanisms.

A problem in the prior art arises pertaining to end-to-end QoS when utilizing such message queues. Thus far, the public Internet has been operating under a "best effort" QoS service model, where the network (i.e., Internet in this example) only makes its "best effort" to deliver data packets. In other words, there is no established QoS, in the sense that an application cannot know the characteristics of the transmission channel in advance. Under such a service model, there are no guarantees regarding packet loss ratios or packet transfer delays, and there is no precise information regarding the available bit rate. This makes it difficult for service providers to introduce any differentiation between consumers or between applications. This situation is changing, however, with the introduction of new Internet service models such as the Integrated Services (IntServ) and Differentiated Services (DiffServ) frameworks. These frameworks allow priority-based QoS mechanisms to some extent. In addition to IP protocols, cellular and other wireless protocols have begun to support QoS. For example, second generation (2G) General Packet Radio Service (GPRS) has specified priorities to support QoS, as have third generation (3G) Universal Mobile Telecommunication System (UMTS) networks.

The end-to-end QoS problem arises largely because the message queues (MQs) are not compatible with these landline and/or wireless QoS mechanisms. For example, assume a scenario where an application developer would like to use the services of MQ for an application that is relatively sensitive with respect to the transfer delay. The MQ appears as a "best effort" component along the path between two communication applications, which could otherwise operate under a more desirable QoS model. Therefore, there is a risk that the best effort MQ will hold the delay-sensitive message while other less delay-sensitive messages are transmitted first. Thus, the MQ bottleneck becomes an impediment to the desired end-to-end QoS data transfer, and in some cases the QoS investment associated with the networking equipment (landline and/or wireless) becomes useless because the end devices' message queue cannot deal with the network QoS.

Figure 2:
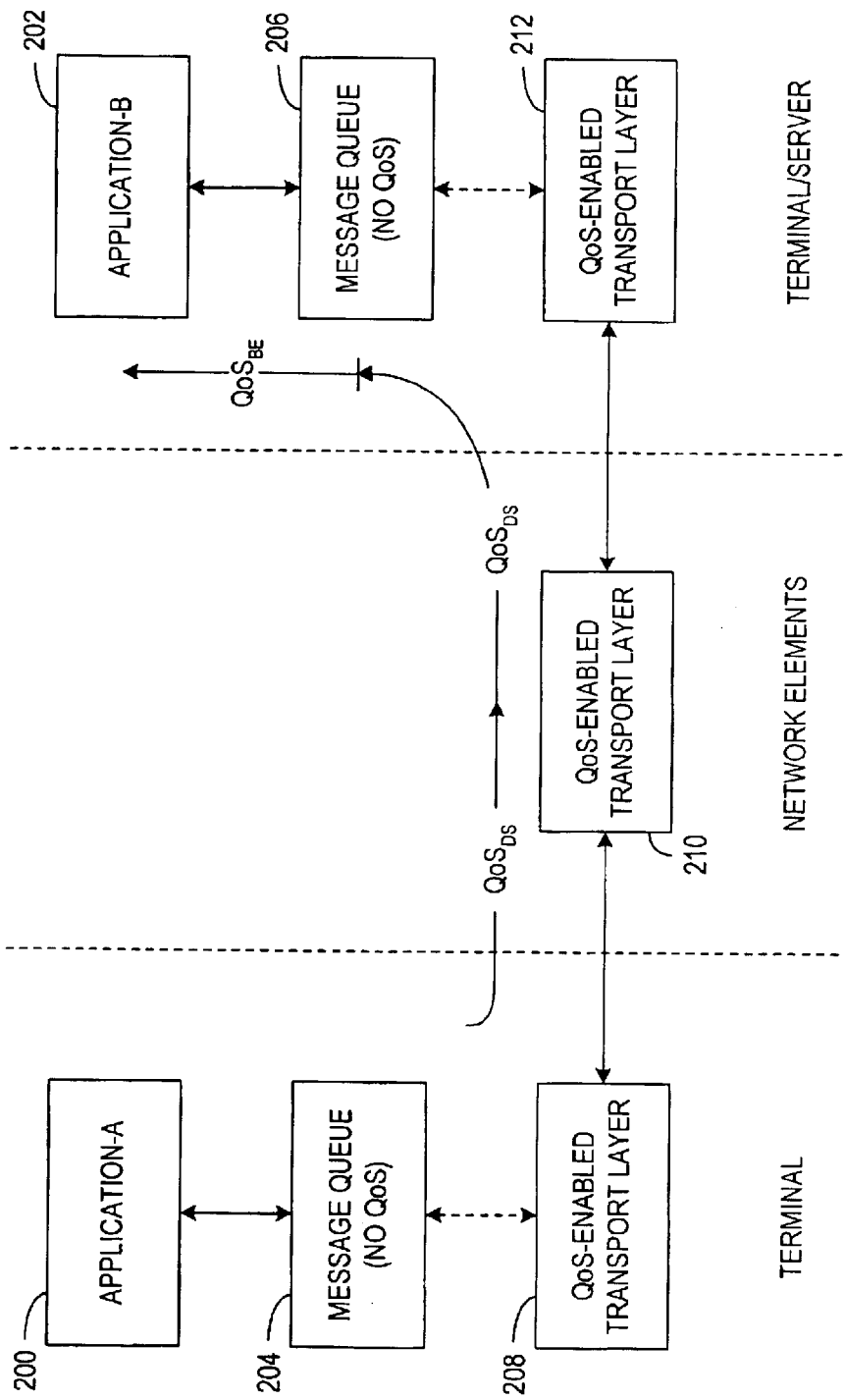
FIG. 2 is a block diagram illustrating a representative manner in which a message queue (MQ) can disrupt the end-to-end QoS otherwise supported by a network.

FIG. 2 is a block diagram illustrating a representative manner in which a message queue (MQ) can disrupt the end-to-end QoS otherwise supported by a network. In this representative example, two applications are to communicate with one another. More particularly, application-A 200 is to communicate with application-B 202. These applications 200, 202 may be in different devices (e.g., mobile devices, computers, servers, etc.), or may be different applications or application instances within a particular device. In the illustrated embodiment, application-A 200 is shown in a terminal (mobile or landline), and application-B 202 is shown in another terminal or network server. The network may support priority-based QoS mechanisms, such as in the case of a Differentiated Services (DiffServ) framework. Thus, application-A 200 may be capable of initiating the end-to-end chain of QoS under the DiffServ framework, represented by the DiffServ Quality of Service $QoS_{DS}$. In a situation where no message queues 204, 206 are used, the $QoS_{DS}$ may be implemented through the entire chain between application-A 200, the QoS-enabled transport layers 208, 210, 212 in the terminal, network elements, and terminal/server respectively, and ultimately to application-B 202.

However, when "best effort" MQs 204 and 206 are introduced, the $QoS_{DS}$ is disrupted at one or both of the message queues 204, 206. More particularly, where MQ 206 has no real QoS and operates under a best effort model, the $QoS_{DS}$ cannot be maintained, and the quality of service is degraded to a best effort $QoS_{BE}$ (i.e., essentially no real quality of service mechanism). Thus, if the application-A 200 uses the services of MQ, the MQ 204, 206 without QoS disables the end-to-end chain of quality of service. In a worst-case scenario, the QoS mechanisms at IP or wireless layers and in network elements become useless.

Therefore, when more QoS-sensitive services are deployed, such as streaming calls and/or video calls, it is essential to extend QoS to all components between communicating applications, including the MQ(s). The present invention provides a QoS-enabled Message Queue, so that the entire chain between communicating applications supports QoS. A major benefit is that the end devices (e.g. mobile terminal and/or server) are also able to support end-to-end QoS. This will result in MQs that do not become the bottleneck that disrupts the QoS seen by the end user. Thus, devices and operating systems can provide better quality of service for the end users.

Figure 3:
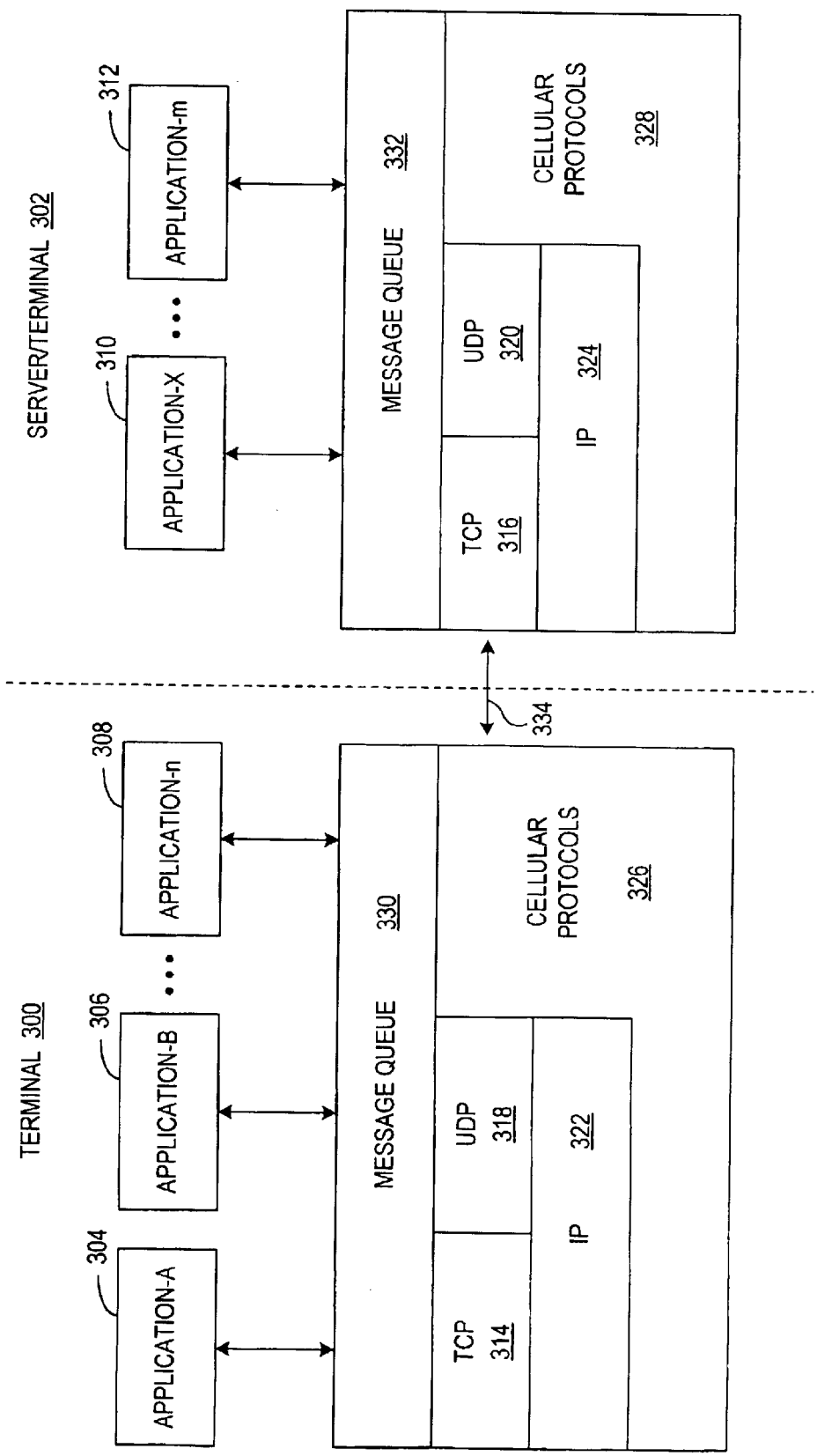
FIG. 3 is a block diagram illustrating a representative example of the architectural placement of the message queue in a layered software architecture.

FIG. 3 is a block diagram illustrating a representative example of the architectural placement of the message queue in a layered software architecture. This embodiment assumes wireless/cellular communication between applications of a wireless terminal 300 and another terminal or server (server/terminal 302). The terminal 300 includes representative applications including application-A 304, application-B 306, through an indeterminate number of applications represented by application-n 308. Similarly, the server/terminal 302 includes representative applications including application-X 310 through an indeterminate number of applications represented by application-m 312 These applications, together with any desired or required Application Programming Interfaces (APIs), represent the application layer of each of the stacks.

The Transmission Control Protocol (TCP) 314, 316 and User Datagram Protocol (UDP) 318, 320 stack services depict representative transport-layer protocols. Typically, either TCP or UDP protocols are used for Mobile Internet devices to carry application-related messages. The Internet Protocol (IP) 322, 324 stack services depict a representative network-layer protocol, which has been used to carry the data over IP-based networks. In the illustrated embodiment, various wireless/cellular protocols 326, 328 may represent protocols between the data link layers and transport layers. Such protocols include, for example, Short Messaging Service (SMS), Multimedia Messaging Service (MMS), Wireless Application Protocol (WAP), etc. Architecturally, MQ 330, 332 is positioned between communication protocols and applications in the example shown in FIG. 3. The connection between the terminal 300 and the server/terminal 302, as depicted by communication path 334, may be an unreliable connection that may only be available sporadically. The MQ 330, 332 addresses this situation, while providing QoS in accordance with the present invention.

Figure 4:
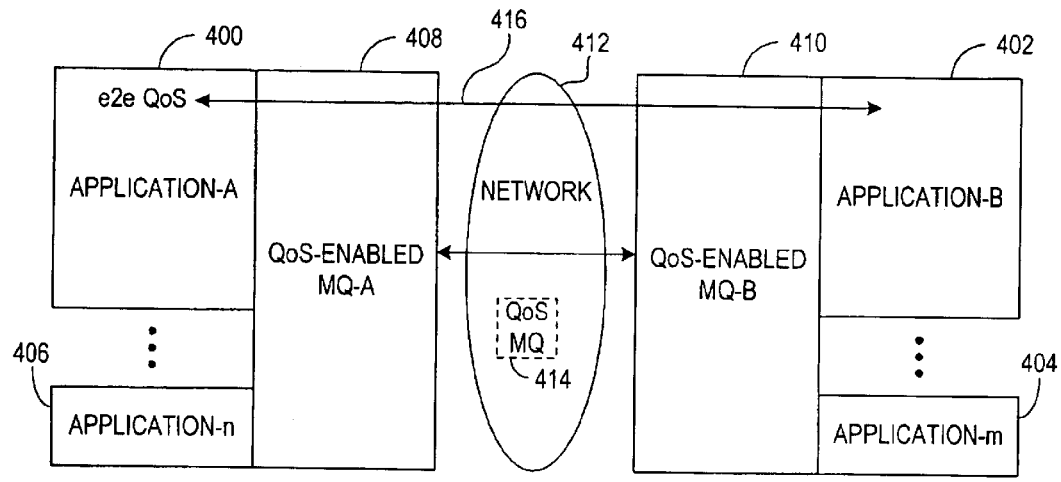
FIG. 4 is a block diagram generally illustrating one embodiment of a communication system employing at least one MQ and providing end-to-end QoS in accordance with the present invention.

As previously indicated, the use of MQs in a communication path, although beneficial for its intended purpose, can eliminate any benefit otherwise provided by implementing QoS on the networks. FIG. 4 is a block diagram generally illustrating one embodiment of a communication system employing at least one MQ and providing end-to-end QoS in accordance with the present invention. Application-A 400 may communicate messages to other applications, such as to application-B 402 or other applications-m 404. Similarly, application-B 402 may communicate messages to other applications, such as to application-A 400 or other applications-n 406. The Message Queues (MQs) 408, 410 are provided to receive messages from the corresponding application, and forward the messages to the recipient application in another system or device. The MQs 408, 410 also store the messages, such as when there is disrupted or terminated connectivity between the communicating applications 400, 402, or when the network 412 can only provide low bandwidth resulting in accumulation of messages.

Where messages are transmitted over a network 412, Quality of Service (QoS) mechanisms 414 may be implemented for network transfers. For example, DiffServ and/or IntServ frameworks facilitate the transfer of information at IP layers pursuant to a QoS. Further, cellular protocols may support QoS where the network 412 includes wireless networks. In accordance with the invention, the MQs 408, 410 implement QoS functionality so that they do not thwart the QoS mechanisms operable on the network 412. Thus, end-to-end QoS-based transmission of messages between applications such as application-A 400 and application-B 402 may be accomplished while still using message queues. This is accomplished by implementing QoS functionality in the message queues, as depicted by QoS-enabled MQ-A 408 and QoS-enabled MQ-B 410. Thus, when more QoS-sensitive services are deployed, such as streaming data or video calls, the QoS is extended to all components between the communicating applications 400, 402, including the MQs 408, 410. In this manner, the QoS can be maintained through the entire end-to-end message transmission between application-A 400 and application-B 402 as depicted by end-to-end QoS line 416. This end-to-end QoS can be provided between any number of applications 400, 402, 404, 406 in which messages are transmitted. One major benefit presented by the present invention is that the end devices, such as mobile terminals, servers, and/or other network elements, are able to support end-to-end QoS. Thus, the MQ does not become the bottleneck that disrupts the QoS seen by the end user.

Figure 5:
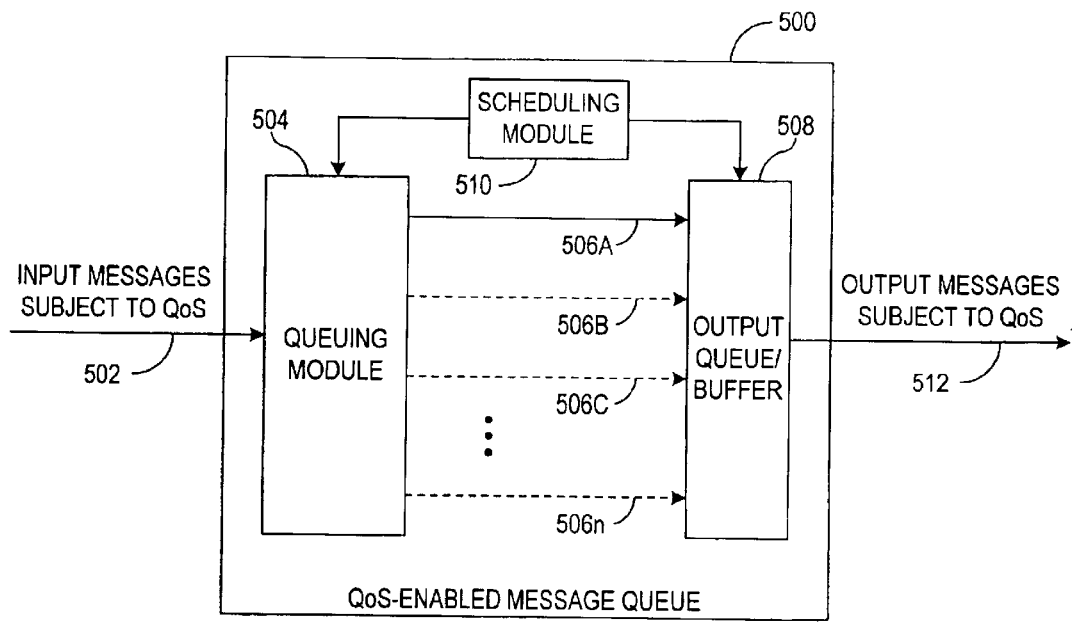
FIG. 5 is a block diagram illustrating one embodiment of a QoS-enabled MQ in accordance with the present invention.

FIG. 5 is a block diagram illustrating one embodiment of a QoS-enabled Message Queue 500 in accordance with the present invention. Networks employing QoS may transmit messages subject to the QoS parameters from one or more applications, as depicted by input message path 502. These messages may be queued by the queuing module 504. The queuing module 504 queues the received messages in a manner that facilitates distinction between the QoS accorded to the particular messages received at the MQ 500. For example, the queuing module 504 may include a plurality of queuing functions, such as software-implemented queuing structures, linked lists, and the like. While hardware queuing mechanisms may also be employed in connection with the present invention, software queuing mechanisms may be preferred due to the relative processing efficiency gained using software queuing methodologies. Depending on the number of queuing functions provided by the queuing module 504, a number of queued message paths 506A, 506B, 506C . . . 506n may be provided to the output queue/buffer 508. In such an embodiment, a scheduling module 510 can control the order in which the messages associated with message paths 506A, 506B, 506C . . . 506n will be output, which ultimately provides a QoS for these outgoing messages that are output via output message path 512. Alternatively, the queuing module 504 may, in connection with the scheduling module 510, internally determine the order in which the messages are to be output, and output the ordered messages to the output buffer 508 as depicted by message path 506A.

The queuing module 504 thus distinguishes between messages of different QoS. In one embodiment, this may be performed using a priority mechanism associated with the queuing module 504. For example, the queuing module 504 may recognize QoS distinctions of the received messages, and associate these received messages with the appropriate one of the plurality of queuing structures within the queuing module 504. Such a prioritization module may be implemented internally to the queuing module 504 as in the illustrated embodiment, or may be implemented using a prioritization module (not shown) which in turn directs the queuing module 504 to place incoming messages in the appropriate queue. Other embodiments of QoS-enabled MQs in accordance with the present invention are described below.

Figure 6:
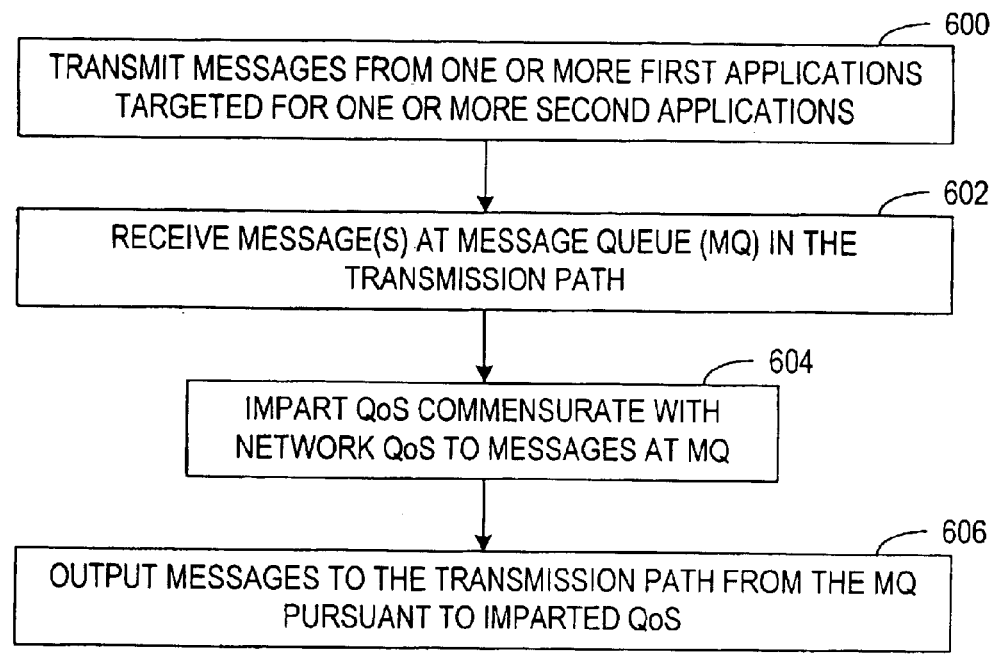
FIGS. 6, 7, and 8 are flow diagrams illustrating various embodiments of a method for providing end-to-end QoS using message queues in accordance with the present invention.

FIG. 6 is a flow diagram illustrating one embodiment of a method for providing end-to-end QoS using message queues in accordance with the present invention. Messages from one or more first applications and targeted for one or more second applications are transmitted 600. For example, one or more applications or application instances on a single device (e.g., mobile terminal, network element, etc.), or one or more applications from different devices, may utilize an MQ to buffer messages targeted for other applications. It should be noted that the "applications" from which messages may be transmitted include any type of software module, including programs, user-accessible software applications, user-inaccessible software applications, utility programs, operating systems, etc. The messages are received 602 at the MQ. A QoS is imparted 604 to the messages at the MQ, where in one embodiment of the invention the QoS that is imparted to the messages is commensurate with a QoS otherwise implemented on the network. For example, where the network implements a DiffServ QoS framework based on priority of messages, the QoS imparted to messages at the MQ may be based on analogous priority parameters in accordance with one embodiment of the invention. The messages are output 606 to the transmission path(s) from the MQ pursuant to the QoS imparted to the messages. For example, for priority-based QoS, the messages may be output in an order substantially corresponding to the priority of the messages.

Figure 7:
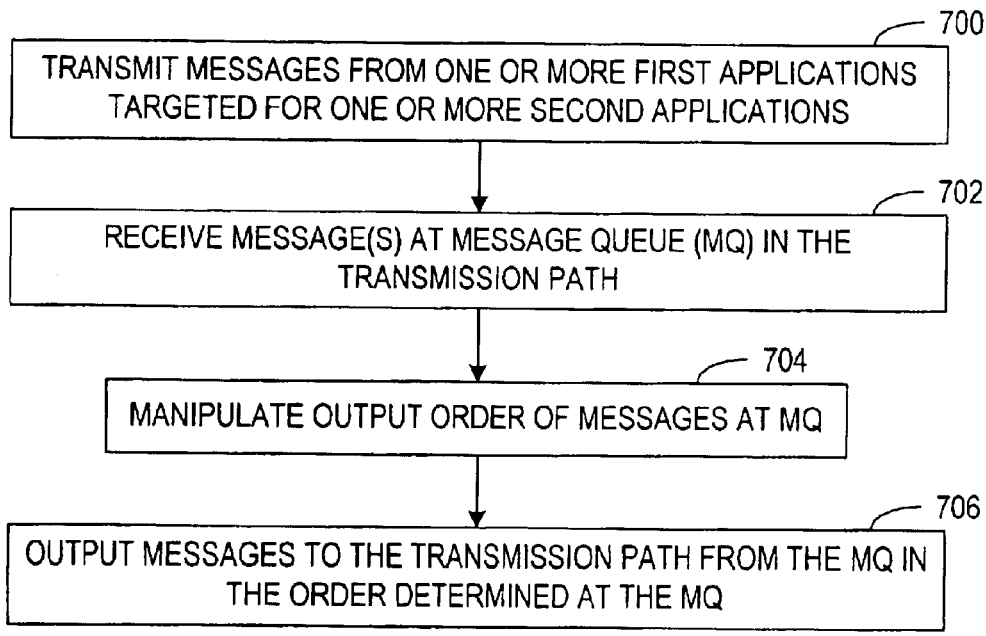

FIG. 7 is a flow diagram illustrating another embodiment of a method for providing end-to-end QoS using message queues in accordance with the present invention. Again, messages from one or more first applications and targeted for one or more second applications are transmitted 700, and the messages are received 702 at the MQ. In the illustrated embodiment of FIG. 7, the output order of the messages at the MQ is manipulated 704. For example, the output order may be rearranged based on one or more of the identification of the applications, the message type/class, delay sensitivity, loss sensitivity, message priority, message discard/drop probability, allocated bandwidth share, etc. Further, the output order may be rearranged based on a network QoS applied to message transfers over a network, such as the Integrated Services (IntServ) model, the Differentiated Services (DiffServ) model, or other model. For example, if the transmitted message is transmitted via packets having a header, one or more header fields may indicate that the packet is to be transmitted via the DiffServ model, or may provide indications of other detectable parameters such as the message type/class, delay sensitivity, priority, etc. The messages are then output 706 to the transmission path from the MQ in the order determined at the MQ.

Figure 8:
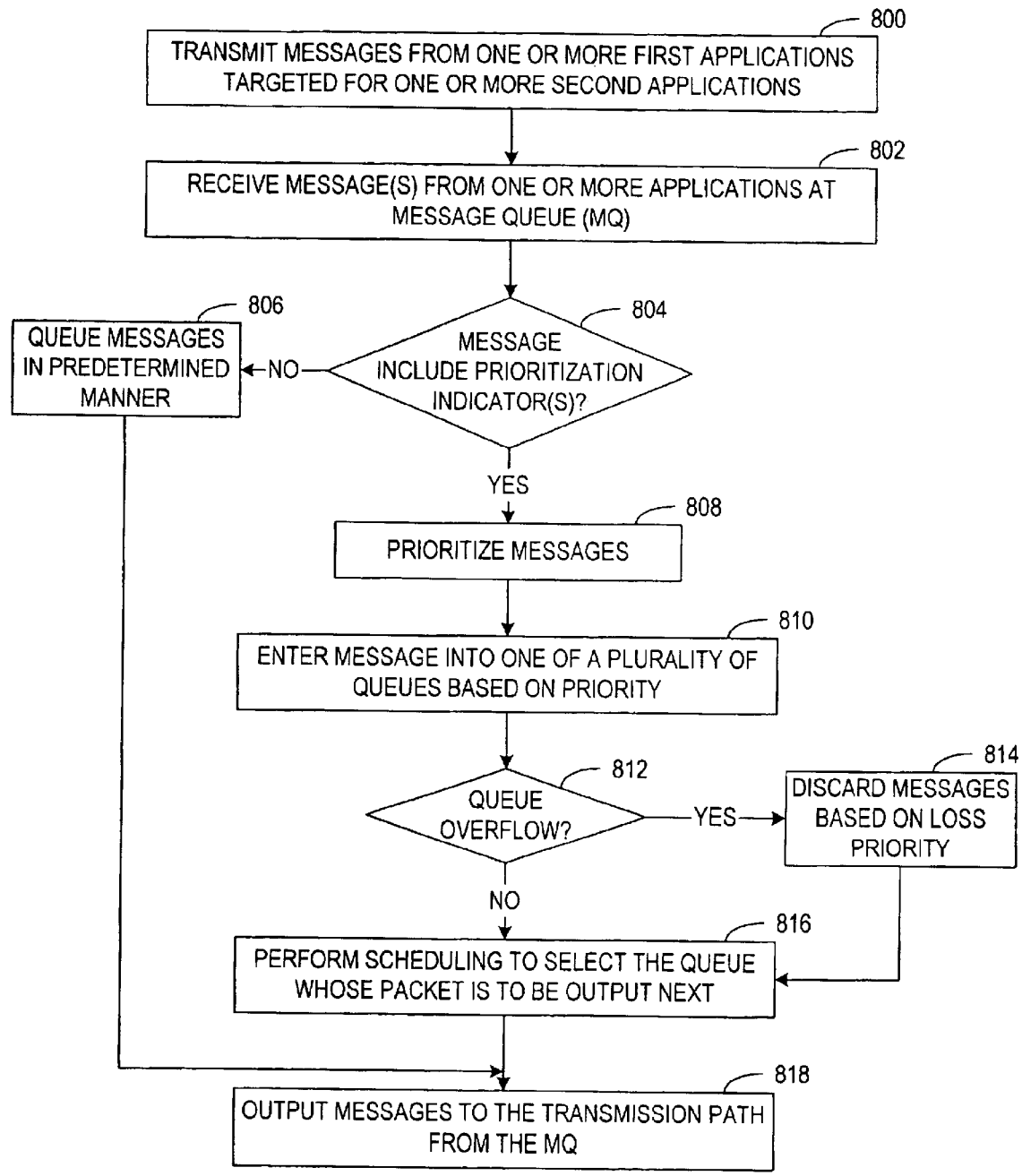

FIG. 8 is a flow diagram illustrating a more particular embodiment of a method for providing end-to-end QoS using message queues in accordance with the present invention. Again, messages from one or more first applications and targeted for one or more second applications are transmitted 800. The messages from the one or more applications are received 802 at the MQ. The messages may include one or more parameters or other indicators that are indicative of a priority, loss sensitivity, delay sensitivity, etc. (collectively referred to as prioritization indicators for purposes of FIG. 8). For example, messages may be prioritized based on application, such that an identification of each application (including application instances) may be used as the priority indicator. As further examples, a message may include a priority value indicating the desired priority for such message in accordance with a particular QoS. Another prioritization indicator may include a loss sensitivity indicator or delay sensitivity indicator. These and other such indicators may be provided, for example, in the message or in a header field of a packet transmitting the message. Other prioritization indicators may be the message type itself. For example, if it can be ascertained that the message is an audio message, this indicates that it may be sensitive to delay, as audio transmissions are often conducted in real time. As another example, if it can be ascertained that the message is a data message, this indicates that the message(s) may be sensitive to loss, as the loss of any data may significantly impact the integrity of the transmitted data. These and other indicators may be analyzed at the MQ in order to impart the desired QoS to the messages traversing the MQ. In addition, the indicators may be provided to MQ separately from the actual message, for example using a signaling method at the control plane. Thus, the indicators do not need to actually be a part of the message payload or message header.

Thus, it may be determined 804 whether the message includes any such indicators. If not, the MQ may simply queue the messages in some predetermined manner as shown at block 806. For example, messages providing no prioritization information may simply be queued in a first-in, first-out (FIFO) fashion, thereby resulting in a "best effort" message transmission paradigm. Alternatively, where QoS is being implemented on the transmission path (e.g., network), prioritization indicators may be obtained from the message, thereby facilitating prioritization 808 of the messages at the MQ based on one or more of message priority, delay sensitivity, loss sensitivity, message type, etc.

In the illustrated embodiment of FIG. 8, the prioritized messages are entered 810 into one of a plurality of queues based on their relative priorities. For example, the MQ may include three queues, one for each of high, medium, and low priority messages. It should be noted that while by default at the MQ or application level messages are not generally discarded (in contrast to IP packets), it may be possible to have overflow situations. For example, a queue may be prone to overflow where a mobile terminal is for long periods out of a coverage area, resulting in a backlog of queued messages. Further, congestion handling may be based on a separate message loss priority. In this case, if an overflow threatens a queue, messages may be discarded 814 based on this message loss priority. Several methods are known to those skilled in the art to handle message drops in such a case. For example, Weighted Fair Queuing (WFQ) can be used to discard messages with lower loss priority.

When messages have been entered 810 onto the various queues of the MQ, scheduling 816 is then performed to select the queue whose packet(s) is to be output next. Thus, scheduling 816 determines the order in which messages will be pulled off the queues for transmission. Any desired algorithm or methodology may be used to perform such scheduling. For example, a weighted round-robin methodology may be used to ensure that higher priority messages are transmitted, but also ensures that low priority packets are not entirely disregarded. Alternatively, the highest priority queue having messages therein may be emptied before moving onto lower priority queues. Again, any desired scheduling methodology may be used. The messages are then output 818 to the wireline/wireless transmission path from the MQ. In this manner, a QoS is imparted to the messages at the MQ, and end-to-end QoS can be effected.

Figure 9:
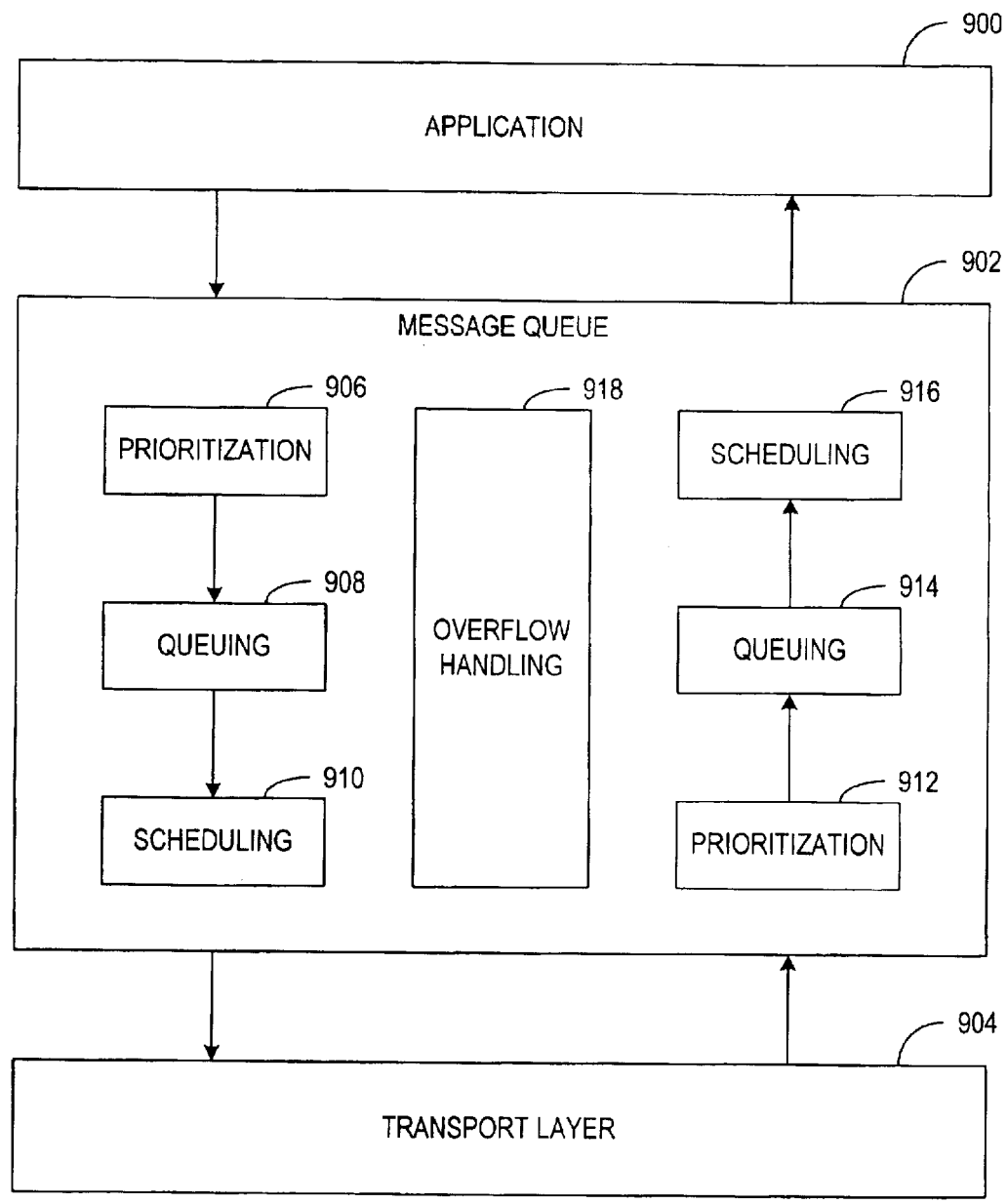
FIG. 9 is a block diagram illustrating one embodiment of a MQ incorporating QoS mechanisms in accordance with the principles of the present invention.

FIG. 9 is a block diagram illustrating one embodiment of a MQ incorporating QoS mechanisms in accordance with the principles of the present invention. One or more applications 900 may be operating on a device coupled to a network. For example, the device may include mobile phones or other communicators, PDAs, laptop or desktop computers, or other wireless or wireline computing systems capable of communicating information over a network.

The message queue (MQ) 902 in the illustrated embodiment is implemented between the application 900 layer and the transport layer 904. In this example, it is proposed that the MQ supports prioritization of messages to correlate to, for example, DiffServ systems of IP routers. The MQ 902 illustrates a representative QoS-enabled MQ that supports prioritization in accordance with the present invention. The same MQ may be used both towards networks and towards the application, although this is not required. For purposes of discussion, it is assumed that the MQ 902 may be used for incoming and outgoing messages from the application's 900 viewpoint.

The MQ 902 of FIG. 9 is created based on various mechanisms, including, for example, prioritization, queuing, scheduling, and possibly packet loss handling. In FIG. 9, such mechanisms include the prioritization module 906, queuing module 908, and scheduling module 910 when considering message transmission from the application 900 to the network. Considering message transmission towards the application 900, the mechanisms are illustrated as the prioritization module 912, queuing module 914, and scheduling module 916. The overflow handling module 918 represents the packet loss handing of the representative MQ 902.

While prioritization, queuing, and scheduling may be performed differently depending on the direction of message flow, it will be assumed for purposes of the discussion of FIG. 9 that like modules perform in a like manner. The prioritization modules 906, 912 prioritize messages based on, for example, the sensitivity for delay or loss of the messages. It should be noted that such prioritization may be performed by the application 900 and/or by the MQ 902, and is illustrated in FIG. 9 as being performed by the MQ. When performed at the application layer, such prioritization may be performed by the same application from which messages are transmitted, or alternatively by another application capable of prioritizing messages. In the latter case, an Application Programming Interface (API) may be used between such applications to facilitate one application's prioritization of messages from another application. It should also be noted that while at the MQ 902 or application 900 level messages are not discarded by default (in contrast to IP packets), it is still possible to have overflow situations, such as when a mobile device is out of coverage areas for long periods of time.

The queuing modules 908, 914 provides the queuing structures (whether physical or logical), where the selection of the queue in which a particular message is to be included is based on the priority determined by its respective one of the prioritization modules 906, 912. In one embodiment of the invention, the various queues can represent registers or other single-message-entry queues. However, in a preferred embodiment, multiple-message-entry queues are implemented, since particularly low bit-rate connections may introduce long transfer delays, and several messages from the same or different applications 900 need to wait their turn to get to the transport layer 904 and networking layers.

It should also be noted that a single queue may be used, and scheduling algorithms may be used to pull off messages in an order defined by the prioritization modules 906, 912. Alternatively, the messages may be placed in different queuing structures based on their priority. In accordance with the present invention, either single-stage queuing or multi-stage queuing may be implemented in the MQ 902. For example, a single-stage queuing arrangement may include two, three, four, or more queues in which messages are directly input based on prioritization parameters. On the other hand, a multi-stage queuing arrangement may include a hierarchical queuing arrangement, where message are input to queues in a first stage, and messages from different groups of these first stage queues are entered into second, third, or higher stage queues of the multi-stage queuing architecture.

In a similar manner, single-stage or multi-stage scheduling 910, 916 may be used. In either case, the scheduling modules 910, 916 performs the selection of which queue will provide the next message to be transmitted. For example, once messages have been differentiated by priority/queue, the scheduling module 910, 916 identifies which queue will be selected to provide the next message from that queue. In this manner, an order or sequence of messages based on priority is identified for transmission.

The overflow handling module 918 handles possible overflow situations in the various queues. This may be utilized in situations where queues can reach their capacity level. For example, the overflow handling module 918 may include a message drop functionality, where further messages are dropped from a particular queue(s) if the queue has reached its capacity. This can be effected by dropping the most recently received message(s) directed to a queue that has reached its capacity. Alternatively, multi-stage queues may distinguish between higher and lower priority messages in a second, third, etc. stage queue, wherein message dropping can then be implemented on these higher stage queues. In other words, a hierarchical, multi-stage queuing structure may facilitate more targeted dropping of messages when necessary due to queues reaching their capacity.

Figure 10:
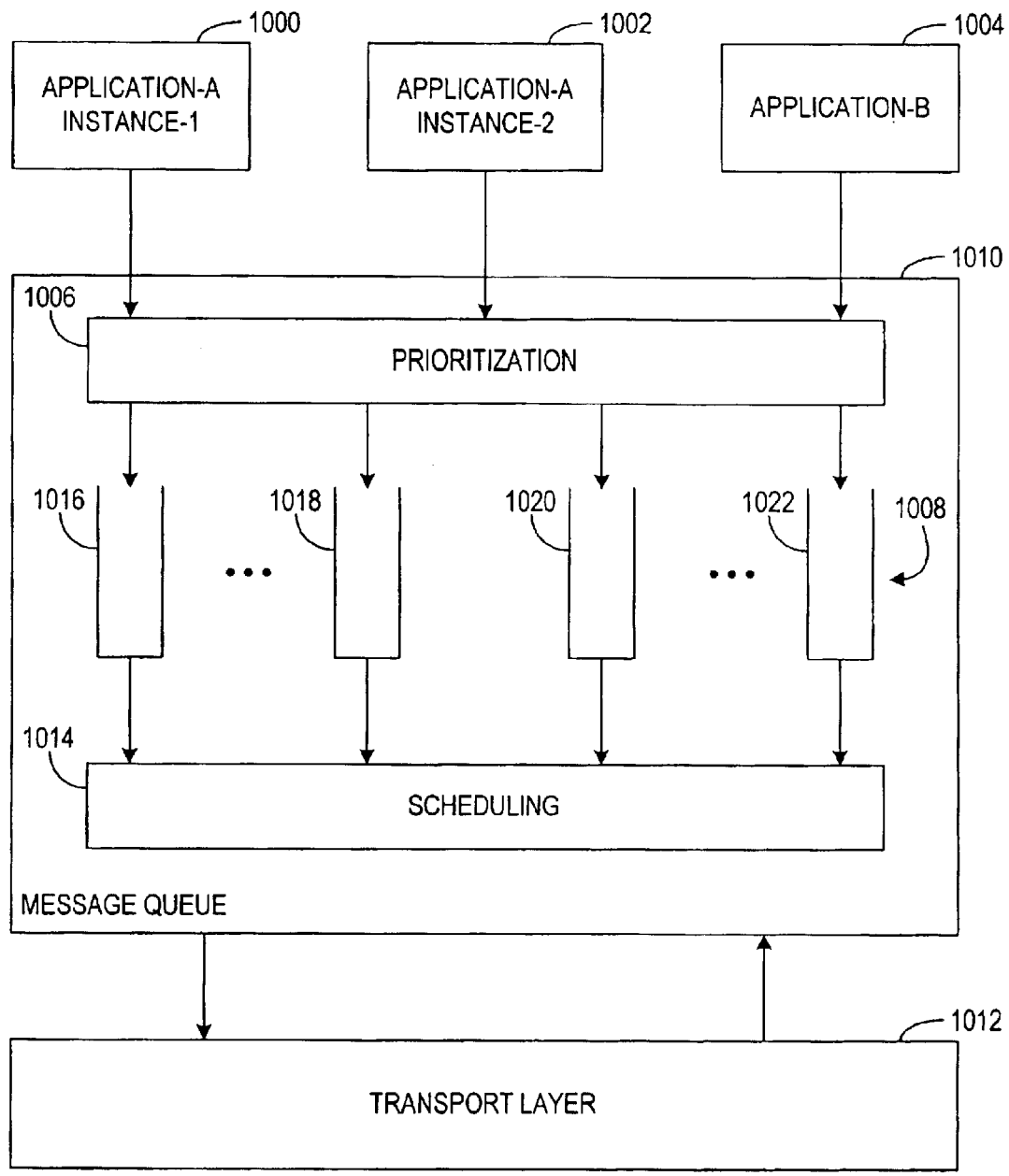
FIG. 10 is a block diagram illustrating a representative example of a queuing arrangement in accordance with the present invention.

FIG. 10 is a block diagram illustrating a representative example of a queuing arrangement in accordance with the present invention. The illustrated example includes any number of applications, such as application-A instance-1 1000, application-A instance-2 1002, and application-B 1004. In accordance with the present invention, prioritization 1006 and queuing 1008 can be applied to messages coming from a number of different sources. For example, application-A instance-1 1000 and application-A instance-2 1002 may represent two instances of one application, such as different instances of a browser application. In such case, messages may be received from either or both of the running browser instances. In one embodiment, the top-most browser may receive higher priority than those running in the background, and thus prioritization 1006 and queuing 1008 can distinguish between such messages queue them accordingly. Messages of different priorities can also come from the same application process, such as a browser application. For example, it is possible that certain requests from the browser (or other application) are more important than others. As a more particular example, it is possible that certain HTTP GET requests (Hypertext Transfer Protocol "GET" method is commonly used to request resources from a web server) are considered more important than others, and the prioritization 1006 and queuing 1008 can thus prioritize and queue such requests accordingly. Messages of different priorities can also come from different applications. For example, e-mail synchronization messages may receive lower priority than browser application messages of the top-most, active browser, or even lower priority than background browser applications. Thus, prioritization and queuing can be effected for messages coming from a variety of related or unrelated application sources.

In the embodiment of FIG. 10, the MQ 1010 is again placed between the application layer and the transport layer 1012. Further, the prioritization 1010 and scheduling 1014 operate in a manner as previously described. In the illustrated embodiment, the queuing structure 1008 includes a plurality of queues (physical and/or logical) including queues 1016, 1018, 1020, 1022. In this implementation, the prioritization module 1006 prioritizes messages and directs them to an appropriate one of the plurality of queues 1016, 1018, 1020, 1022 based on the ascertained priority associated with each message. For example, highest priority messages may be directed to queue 1022, video messages may be directed queue 1020, low priority messages may be directed to queue 1016, etc. Any desired single-stage or multi-stage queuing arrangement 1008 may be implemented.

Figure 11:
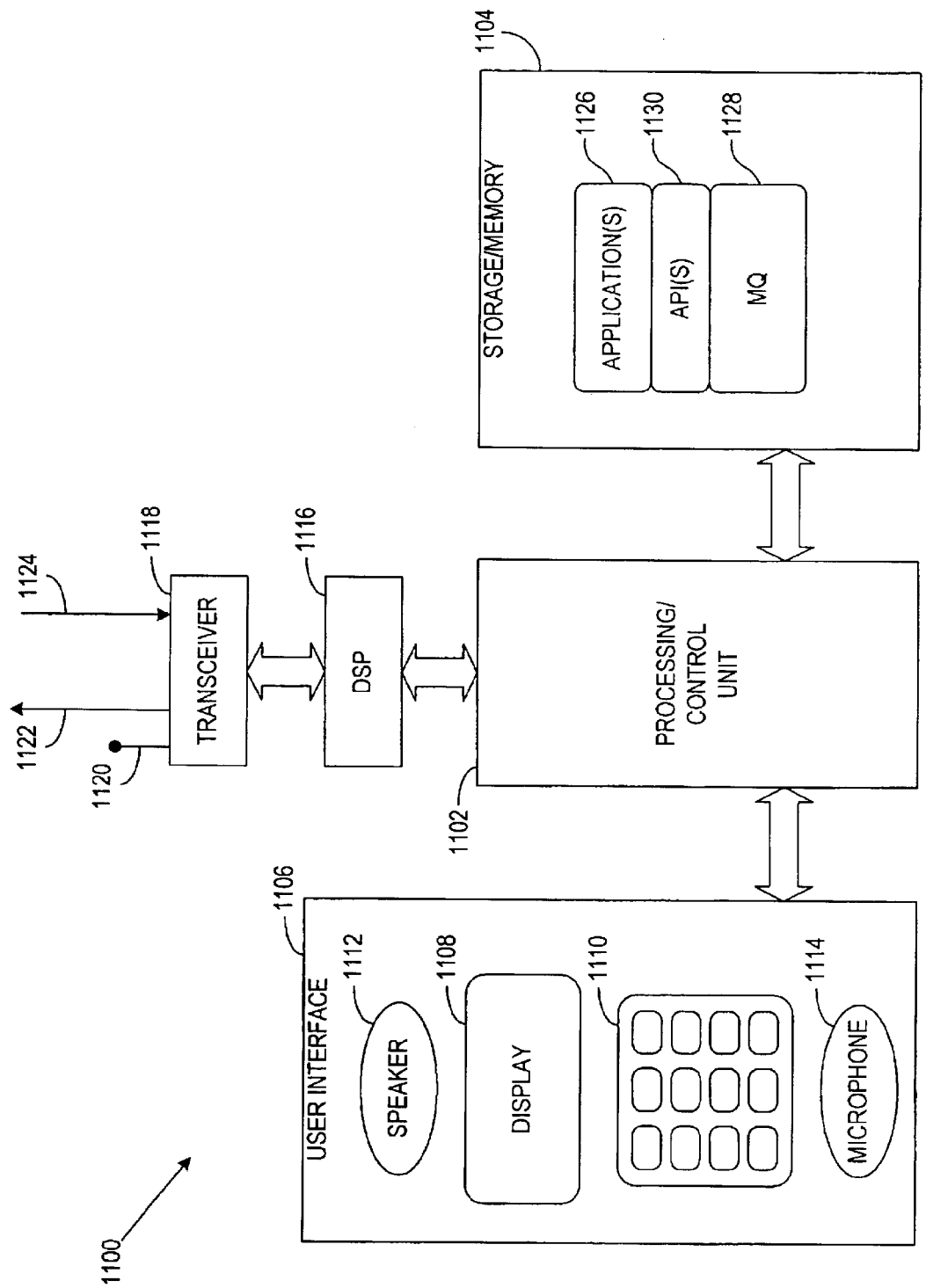
FIG. 11 is a block diagram illustrating a representative mobile terminal computing system capable of carrying out operations in accordance with the invention.

The present invention may be used to facilitate end-to-end QoS message transmissions to/from applications in any type of device that can communicate with the network or other connection. Such devices include computing devices such as desktop computers, workstations, laptop computers, or any other computing system capable of accessing information via a network. Such computing devices also include network servers, such as content servers, storage servers, Multimedia Messaging Service Centers (MMSC) for Multimedia Messaging Service (MMS), Short Message Service Centers (SMSC) for Short Message Service (SMS), or any other network element capable of communicating with other systems and devices over a network, such as the Internet. These devices also include mobile devices, where network access is accomplished via a wireless network that may or may not ultimately be coupled to a landline network. These mobile devices may be any type of wireless device, such as wireless/cellular telephones, personal digital assistants (PDAs), or other wireless handsets, as well as portable computing devices capable of wireless communication. These landline and mobile devices utilize computing circuitry and software to control and manage the conventional device activity as well as the functionality provided by the present invention. Hardware, firmware, software or a combination thereof may be used to perform the various QoS-enabled MQ operations described herein. An example of a representative mobile terminal computing system capable of carrying out operations in accordance with the invention is illustrated in FIG. 11. Those skilled in the art will appreciate that the exemplary mobile computing environment 1100 is merely representative of general functions that may be associated with such mobile devices, and also that landline computing systems similarly include computing circuitry to perform such operations.

The exemplary mobile computing arrangement 1100 suitable for performing the QoS-enabled MQ functions in accordance with the present invention may be associated with a number of different types of wireless devices. The representative mobile computing arrangement 1100 includes a processing/control unit 1102, such as a microprocessor, reduced instruction set computer (RISC), or other central processing module. The processing unit 1102 need not be a single device, and may include one or more processors. For example, the processing unit may include a master processor and associated slave processors coupled to communicate with the master processor.

The processing unit 1102 controls the basic functions of the mobile terminal as dictated by programs available in the program storage/memory 1104. Thus, the processing unit 1102 is capable of executing QoS-enabled MQ functions associated with the present invention, such as prioritization, queuing, and scheduling. More particularly, the program storage/memory 1104 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. In one embodiment of the invention, the program modules associated with the storage/memory 1104 are stored in non-volatile electrically-erasable, programmable ROM (EEPROM), flash ROM, etc. so that the information is not lost upon power down of the mobile terminal. The relevant software for carrying out conventional mobile terminal operations and operations in accordance with the present invention may also be transmitted to the mobile computing arrangement 100 via data signals, such as being downloaded electronically via one or more networks, such as the Internet and an intermediate wireless network(s).

The processor 1102 is also coupled to user-interface 1106 elements associated with the mobile terminal. The user-interface 1106 of the mobile terminal may include, for example, a display 1108 such as a liquid crystal display, a keypad 1110, speaker 1112, and microphone 1114. These and other user-interface components are coupled to the processor 1102 as is known in the art. Other user-interface mechanisms may be employed, such as voice commands, switches, touch pad/screen, graphical user interface using a pointing device, trackball, joystick, or any other user interface mechanism.

The mobile computing arrangement 1100 also includes conventional circuitry for performing wireless transmissions. A digital signal processor (DSP) 1116 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 1118, generally coupled to an antenna 1120, transmits the outgoing radio signals 1122 and receives the incoming radio signals 1124 associated with the wireless device.

In accordance with the present invention, the QoS-enabled MQ functionality may be implemented in, for example, operating systems or software architectures. For example, the processor 1102 can provide the QoS-enabled MQ functionality under the direction of program modules stored in the program storage/memory 1104. Applications 1126 and MQ 1128 programs may be stored in the storage/memory 1104. An Application Programming Interface (API) 1130 may be used to facilitate the transfer of messages between the MQ 1128 and applications 1126.

The mobile computing arrangement 1100 of FIG. 11 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a QoS-enabled MQ system and method in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A method for buffering messages between at least two applications over a network, comprising:

transmitting one or more messages from a source application to an intermediary application Message Queue (MQ) for buffering the messages between the source application and one or more target applications;

imparting an MQ Quality of Service (QoS) on a flow of the messages traversing the application MQ; and transmitting the flow of messages from the application MQ subject to the MQ QoS.

2. The method of claim 1, further comprising receiving the messages subject to the MQ QoS at the one or more target applications.

3. The method of claim 1, wherein imparting an MQ QoS on a flow of the messages comprises imparting an MQ QoS commensurate with a network QoS applied to the flow of messages traversing the network.

4. The method of claim 3, further comprising receiving the messages at the one or more target applications subject to the MQ QoS and the network QoS.

5. The method of claim 1, wherein imparting an MQ QoS on the flow of messages traversing the application MQ comprises imparting an MQ QoS that approximates a network QoS to substantially maintain an end-to-end QoS otherwise subjected to the messages traversing the network.

6. The method of claim 1, wherein the intermediary application MQ is implemented in a network element coupled to the network, wherein the network element is distinct from a source device hosting the source application and a recipient device hosting a target application, and wherein the application MQ is logically configured above protocol layers managing communication of the messages over the network.

7. The method of claim 1, wherein imparting an MQ QoS on the message flow traversing the application MQ comprises creating the MQ QoS within the application MQ by separating the messages into a plurality of queues corresponding to differing message priorities, and outputting the messages from the plurality of queues according to a predetermined scheduling procedure.

8. The method of claim 1, wherein the intermediary application MQ is logically configured between network communication protocols and the source application.

9. The method of claim 1, wherein the intermediary application MQ is logically configured between network communication protocols and a destination application to which at least one of the messages is targeted.

10. A method for buffering messages between at least two applications over a network, comprising:

transmitting one or more messages from a source application to an intermediary Messages Queue (MQ) for message buffering;

imparting an MQ Quality of Service (QoS) on a flow of the messages traversing the MQ;

transmitting the flow of messages from the MQ subject to the MQ QoS; and wherein the intermediary MQ is implemented in a recipient device which also hosts at least one target application, and wherein imparting an MQ QoS on the message flow traversing the MQ comprises imparting the MQ QoS on the message flow at the MQ of the recipient device to provide end-to-end QoS between the source application and the target application.

11. A method for facilitating end-to-end Quality of Service (QoS) communication between at least two applications, comprising:
- transmitting one or more messages from at least one first application and destined for at least one second application;
- receiving the messages from the first application at an application Message Queue (MQ);
- manipulating an output order of the messages at the application MQ to impart a QoS on further transmission of the messages; and
- outputting the messages destined for the second application from the application MQ in the output order corresponding to the imparted QoS.

12. The method of claim 11, wherein transmitting one or more messages from at least one first application comprises transmitting one or more messages from a plurality of applications operable on a sending device, wherein at least some of the messages from the plurality of applications have different prioritization indicators relative to one another which impacts their relative transmission priorities.

13. The method of claim 12, wherein the different prioritization indicators comprise application identifiers associated with each of the plurality of applications.

14. The method of claim 12, wherein the different prioritization indicators comprise one or more prioritization indicators selected from the group comprising a message type, a delay sensitivity, a loss sensitivity, a message priority, a message discard probability, an allocated bandwidth share, and a network QoS model.

15. The method of claim 12, wherein the plurality of applications comprises at least two different applications operable on the sending device.

16. The method of claim 12, wherein the plurality of applications comprises at least two instances of a common application operable on the sending device.

17. The method of claim 11, wherein transmitting one or more messages from at least one first application comprises transmitting one or more messages from a single application operable on a sending device, wherein at least some of the messages from the single application have different prioritization indicators relative to one another which impacts their relative transmission priorities.

18. The method of claim 11, wherein manipulating an output order of the messages at the application MQ comprises at least queuing the messages in a plurality of queues according to their relative transmission priorities, and scheduling output of the messages from the queues according to a predetermined scheduling procedure.

19. The method of claim 18, further comprising prioritizing the messages to identify which of the plurality of the queues in which each of the messages is to be entered.

20. The method of claim 11, wherein receiving the messages from the first application at an application MQ comprises receiving the messages at a recipient application MQ associated with a receiving device on which at least one of the second applications is operating.

21. The method of claim 11, wherein receiving the messages from the first application at an application MQ comprises receiving the messages at a source application MQ associated with a sending device on which at least one of the first applications is operating.

22. The method of claim 11, wherein receiving the messages from the first application at an application MQ comprises receiving the messages at a network MQ associated with a network element coupled to a network, and wherein manipulating an output order of the messages at the application MQ comprises manipulating the output order of the messages at the network MQ as the messages are communicated between the first and second applications over the network.

23. The method of claim 11, further comprising transmitting the messages destined for the second application over a network coupling the first and second applications.

24. The method of claim 11, wherein transmitting the messages over a network comprises transmitting the messages over one or more of a landline and a wireless network.

25. A method for facilitating end-to-end Quality of Service (QoS) communication between at least two applications, comprising:
- transmitting one or more messages from at least one first application and destined for at least one second application;
- receiving the massages from the first application at a Message Queue (MQ), comprising:
  - receiving the messages at a source MQ associated with a sending device on which at least one of the first applications is operating;
  - receiving the messages at a recipient MQ associated with a receiving device on which at least one of the second applications is operating;
- manipulating an output order of the massages at the MQ to impart a QoS on further transmission of the messages, comprising manipulating the output order of the messages at both the source MQ and the recipient MQ as the messages are communicated between the first and second applications over a network; and
- outputting the messages destined for the second application from the MQ in the output order corresponding to the imparted QoS.

26. A method for imparting a Quality of Service (QoS) to messages traversing an application Message Queue (MQ) logically coupled between a source device having at least one source application and a destination device having at least one destination application, the method comprising:
- prioritizing the messages received from the source application into priority classes based on information associated with each of the messages;
- queuing each of the messages into one of a plurality of MQ priority queues associated with the application MQ in response to prioritization of the messages;
- scheduling an output order of the messages from the plurality of MQ priority queues based on a scheduling procedure; and
- passing the messages from the Message Queue to a communication protocol layer for transmission of the messages to the destination application pursuant to the scheduled output order, thereby imparting the QoS to the messages traversing the application MQ.

27. The method of claim 26, wherein prioritizing the messages into priority classes based on information associated with each of the messages comprises prioritizing the messages based on the application from which the messages originated.

28. The method of claim 26, wherein prioritizing the messages into priority classes based on information associated with each of the messages comprises prioritizing the messages into priority classes based on message characteristics indicative of relative priorities between the messages.

29. The method of claim 26, wherein queuing each of the messages into one of a plurality of MQ priority queues associated with the application MQ comprises queuing the messages in a single-stage queuing arrangement.

30. The method of claim 26, further comprising monitoring for overflow of any of the plurality of MQ priority queues, and discarding messages associated with any of the plurality of MQ priority queues that have reached their respective message capacity.

31. The method of claim 30, wherein discarding messages comprises discarding the messages based on a loss priority associated with messages of the MQ priority queue that has reached its message capacity.

32. A method for imparting a Quality of Service (QoS) to messages traversing a Message Queue (MQ) logically coupled between source device having at least one source application and a destination device having at least one destination application, the method comprising:

prioritizing the massages received from the source application into priority classes based on information associated with each of the massages;

queuing each of the messages into one of a plurality of MQ priority queues associated with the MQ in response to prioritization of the messages, wherein queuing each of the messages into one of a plurality of MQ priority queues associated with the MQ comprises queuing the messages in a multi-stage queuing arrangement;

scheduling an output order of the messages from the plurality of MQ priority queues based on a scheduling procedure; and transmitting the messages from the MQ to the destination application pursuant to the scheduled output order, thereby imparting the QoS to the messages traversing the MQ.

33. A system for communicating information between a plurality of applications over a network, comprising:

one or more first applications for generating the messages to be transmitted over the network in accordance with a network Quality of Service (QoS) paradigm;

one or more second applications for receiving the messages via the network; and an application Message Queue (MQ) module coupled to receive the messages via the network prior to receipt of the massages by the one or more second applications, wherein the application MQ is configured to apply an MQ Quality of Service (MQ QoS) to the messages prior to their continued transmission to the one or more second applications.

34. The system of claim 33, wherein the application MQ module comprises a prioritization module coupled to receive the messages and to prioritize the messages received from the first applications into priority classes based on prioritization indicators a associated with each of the messages.

35. The system of claim 33, wherein the application MQ module comprises a queuing module comprising a plurality of priority-based queues to temporarily store the messages, wherein each of the plurality of priority-based queues stores messages having like priorities.

36. The system of claim 35, wherein the application MQ module comprises a scheduling module coupled to the queuing module to govern an order of the output of the messages from the plurality of priority-based queues.

37. The system of claim 35, wherein the priority-based queues comprise software-based queuing structures.

38. The system of claim 33, wherein the first applications comprise a prioritization module to prioritize the messages into priority classes based on prioritization indicators associated with each of the messages, and assigning a priority to each of the messages.

39. The system of claim 38, wherein the application MQ module comprises a queuing module comprising a plurality of priority-based queues to temporarily store the messages, wherein each of the plurality of priority-based queues stores messages having like priorities.

40. The system of claim 39, he application MQ module comprises a scheduling module coupled to the queuing module to govern an order of the output of the messages from the plurality of priority-based queues.

41. The system of claim 33, wherein the application MQ module is configured to apply an MQ QoS substantially emulating the network QoS to facilitate end-to-end QoS transfers.

42. The system of claim 33, wherein the application MQ module comprises a plurality of application MQ modules, one at each of the first and second applications, to apply the MQ QoS to the messages transmitted between the first and second applications.

43. The system of claim 33, wherein the application MQ module comprises an intermediary application MQ module logically coupled between the first and second applications on the network to apply the MQ QoS to the messages transmitted from the first application to the second application, and wherein the intermediary application MQ module is logically configured above communication protocol layers that manage communication of the messages over the network.

44. The system of claim 43, wherein the messages are transmitted from the one or more second applications to the one or more first applications over the network, and wherein the application MQ module is coupled to receive the messages and configured to apply the MQ QoS to the messages transmitted from the one or more second applications to the one or more first applications.

45. A system for communicating information between a plurality of applications over a network, comprising:

one or more first applications for transmitting messages over the network in accordance with a network Quality of Service (QoS) paradigm, wherein at least one of the first applications is operable on a first communication device coupled to the network;

one or more second applications for receiving the messages via the network, wherein at least one of the second applications is operable on a second communication device coupled to the network;

a Message Queue (MQ) module coupled to receive the messages and configured to apply an MQ Quality of Service (MQ QoS) to the messages transmitted from the one or more first applications to the one or more second applications; and wherein the first applications comprise applications selected from the group comprising a plurality of application instances of a common application operable on the first communication device, a plurality of distinct applications operable on the first communication device, and at least one application process including a plurality of message classes and operable on the first communication device.

46. A system for communicating information between a plurality of applications over a network, comprising:

one or more first applications for transmitting messages over the network in accordance with a network Quality of Service (QoS) paradigm;

one or more second applications for receiving the messages via the network; and a Message Queue (MQ) module coupled to receive the messages and configured to apply an MQ Quality of Service (MQ QoS) to the messages transmitted from the one or more first applications to the one or more second applications, wherein the MQ module comprises a software module architecturally positioned between an application layer associated with the first and second applications and a transport layer.

47. A communication device operable on a network, comprising:
(a) one or more application modules for receiving messages from one or more remote applications;
(b) a Message Queue (MQ) module comprising:
 (i) a prioritization module coupled to receive and prioritize the messages received from the remote applications into priority classes based on prioritization indicators associated with each of the messages;
 (ii) a plurality of priority-based queues, each to temporarily store the messages having like priorities; and
 (iii) a scheduling module coupled to the plurality of queues to govern an order of the output of the messages from the plurality of priority-based queues and targeted for the application modules.

48. The communication device as in claim 47, wherein the network comprises a wireless network, and wherein the communication device comprises a mobile terminal.

49. The communication device as in claim 47, wherein the network comprises a landline network, and wherein the communication device comprises a computing device.

50. A computer-readable medium having instructions stored thereon which are executable by a computing system for buffering messages between at least two applications over a network by performing steps comprising:

transmitting one or more messages from a source application to an intermediary application Message Queue (MQ) for buffering the massages between the source application and one or more target applications;

imparting an MQ Quality of Service (QoS) on a flow of the messages traversing the application MQ; and transmitting the flow of messages from the application MQ subject to the MQ QoS.

51. The computer-readable medium as in claim 50, wherein the instructions for imparting an MQ QoS on the message flow comprise instructions for creating the MQ QoS within the MQ by separating the messages into a plurality of queues corresponding to differing message priorities, and for outputting the messages from the plurality of queues according to a predetermined scheduling procedure.

52. A communication device operable on a network, comprising:
an application module targeted to receive messages from at least one remote application;
a receiver coupled to receive via the network one or more packets carrying the messages from the at least one remote application; and
an application Message Queue (MQ) module coupled to the receiver to receive the messages, and comprising means for imparting an MQ Quality of Service (QoS) on the messages and transferring the messages to the application module subject to the MQ QoS.

53. The communication device as in claim 52, further comprising an Application Programming Interface (API) logically coupled between the application MQ and the application module to facilitate the transfer of the messages from the application MQ to the application module subject to the MQ QoS.

54. The communication device as in claim 52, wherein the MQ QoS provides message throughput substantially commensurate with a network QoS applied to the one or more packets transmitted over the network.

55. The communication device as in claim 52, wherein the communication device comprises a wireless communication device capable of wirelessly communicating the packets over at least a portion of the network.

56. The communication device as in claim 55, wherein the wireless communication device comprises a mobile phone or a Personal Digital Assistant.

57. The communication device as in claim 52, wherein the communication device comprises a computing device capable of communicating the packets over the network.

* * * * *

UNITED STATES PATENT AND TRADEMARK OFFICE
CERTIFICATE OF CORRECTION

PATENT NO.   : 6,940,813 B2
DATED        : September 6, 2005
INVENTOR(S)  : Jussi Pekka Ruutu It is certified that error appears in the above-identified patent and that said Letters Patent is hereby corrected as shown below:

Column 1,
Line 66, "is that is" should read -- is that it --.

Column 3,
Line 29, "between source" should read -- between a source --.

Column 8,
Line 3, "application-m 312" should read -- application-m 312. --.

Column 12,
Line 9, "loss handing of" should read -- loss handling of --.
Line 31, "provides the queuing" should read -- provide the queuing --.
Line 54, "where message are" should read -- where messages are --.
Line 61, "performs the selection" should read -- perform the selection --.

Column 13,
Line 31, "messages queue" should read -- messages and queue --.
Line 51, "prioritization 1010 and" should read -- prioritization 1006 and --.
Line 61, "directed queue" should read -- directed to queue --.

Column 14,
Line 65, "arrangement 100 via" should read -- arrangement 1100 via --.

UNITED STATES PATENT AND TRADEMARK OFFICE
CERTIFICATE OF CORRECTION

PATENT NO. : 6,940,813 B2
DATED : September 6, 2005
INVENTOR(S) : Jussi Pekka Ruutu It is certified that error appears in the above-identified patent and that said Letters Patent is hereby corrected as shown below:

<u>Column 15,</u>
Line 9, "graphical user interface" should read -- graphical user-interface --.
Line 10, "other user interface," should read -- other user-interface --.
Line 39, "a user interface," should read -- a user-interface --.

Signed and Sealed this

Twenty-eighth Day of March, 2006

JON W. DUDAS
*Director of the United States Patent and Trademark Office*